Feb. 13, 1945.   H. W. BALLARD   2,369,518
GROUND STATION FOR AERIAL PICK-UP SYSTEMS
Filed Nov. 8, 1943   2 Sheets-Sheet 1

INVENTOR.
Hyle W. Ballard

Feb. 13, 1945. H. W. BALLARD 2,369,518
GROUND STATION FOR AERIAL PICK-UP SYSTEMS
Filed Nov. 8, 1943 2 Sheets-Sheet 2
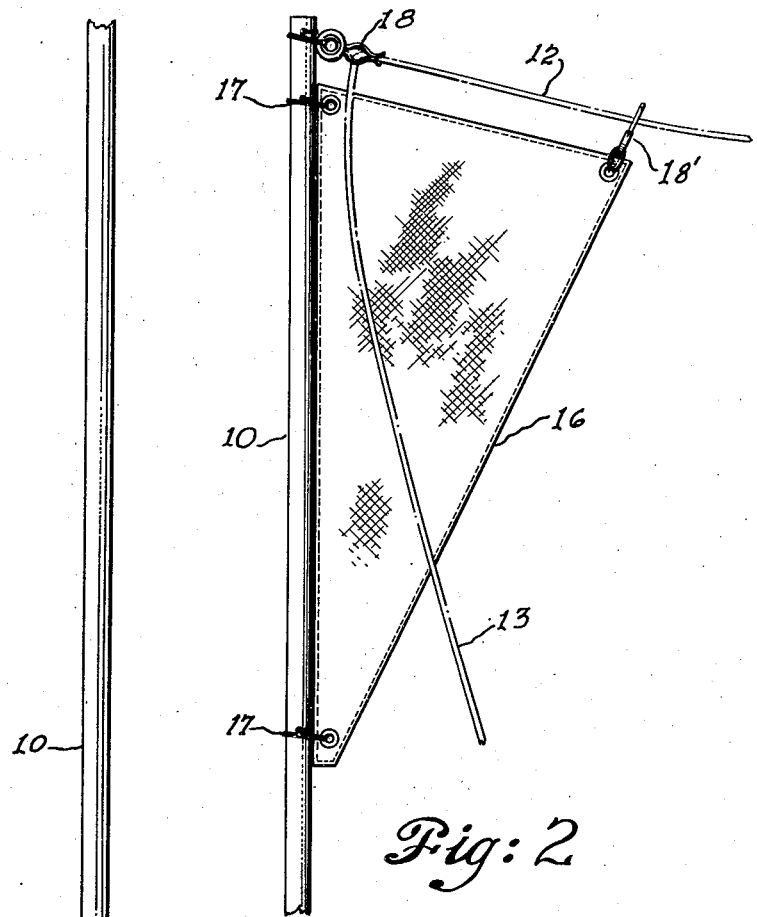
Fig: 2
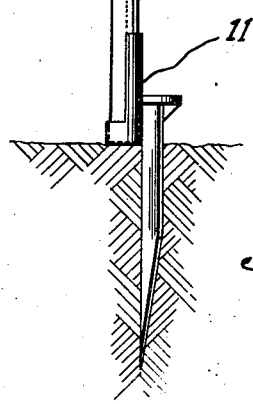
Fig: 3
INVENTOR.
Hyde W. Ballard Patented Feb. 13, 1945

2,369,518

UNITED STATES PATENT OFFICE 2,369,518

GROUND STATION FOR AERIAL PICKUP SYSTEMS

Hyde W. Ballard, Merion, Pa., assignor to All American Aviation, Inc., Wilmington, Del., a corporation of Delaware Application November 8, 1943, Serial No. 509,438

2 Claims. (Cl. 258—1.2)

My invention relates to air pick-up systems and more particularly to ground equipment for supporting a loop or tow line.

In the past it has been found that the visibility of the ground station in air pick-up systems is of extreme importance in aiding the pilot of the pick-up plane to locate the station. It has been customary to use brightly colored flags attached near the top of the station poles. It has also been of importance to maintain these flags in the plane of the station pole to further aid the pilot.

An object of my invention, therefore, is to provide a flag for a pick-up ground station which provides maximum visibility for the pilot and which is maintained in a plane with the poles until pick-up is effected.

A further object of my invention is to provide a flag for a pick-up station pole which is maintained in a stretched position independently of the weight of the pick-up loop.

Another object is to provide a flag for a pick-up station pole which is held in a taut position in the plane of the poles without the use of any rigid lateral supporting means other than the pick-up loop.

Another object is to provide a flag for the above purpose whose size, strength and releasable fitting are independent of the stress which may be imparted to the pole by the pick-up loop.

Further objects will be apparent from reference to the description and the drawings in which:

Figure 2 is a detail of the upper portion of one of the ground station poles showing the flag and loop in pick-up position.

Figure 3 is a detail of the lower portion and supporting socket for the ground station poles.

Figure 1:
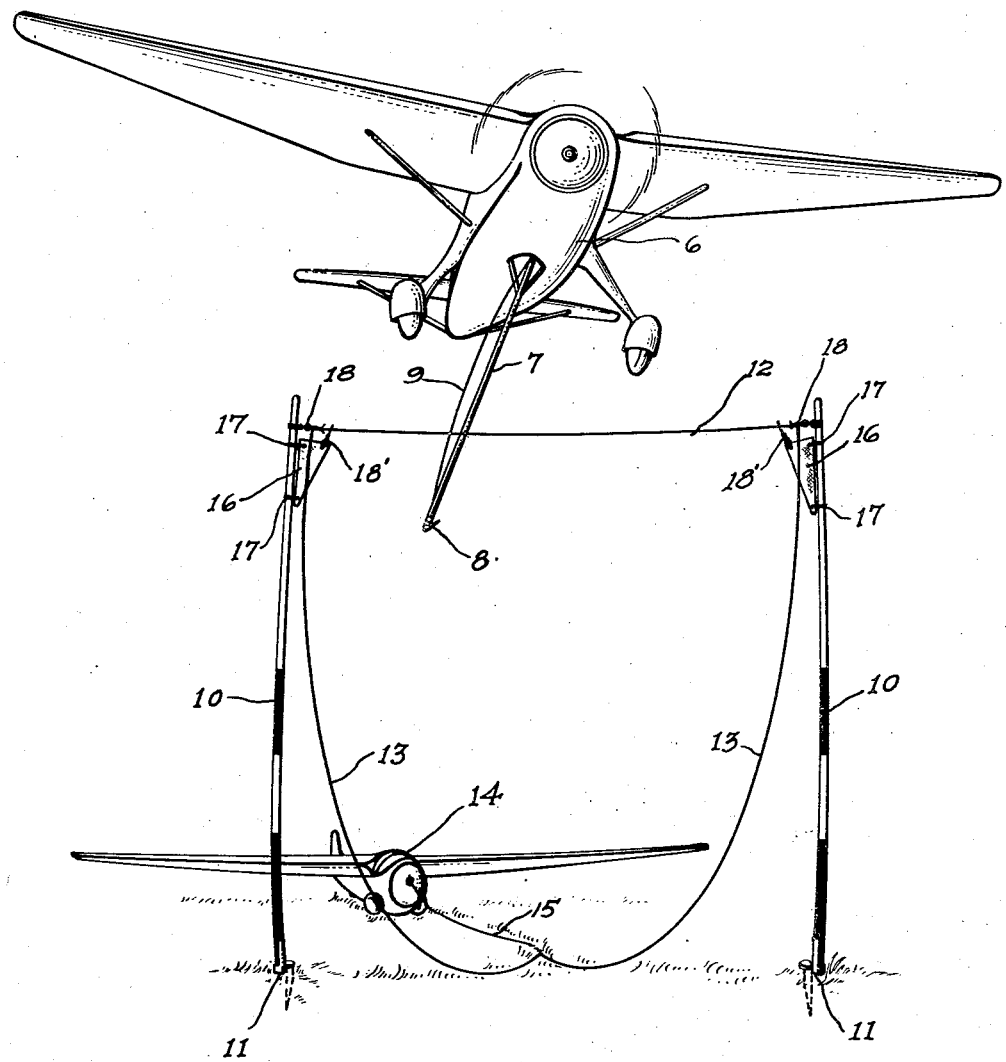
Figure 1 shows an assembled ground station equipped with flags, according to my invention.

A pick-up aircraft denoted generally at 6 has a depending arm 7 and a hook 8 releasably supported thereon. Line 9 is attached to the hook 8 at one end and is wound upon a winch (not shown) inside the aircraft. Poles 10 are supported at their lower ends by sockets 11 and at their upper ends by the upper portion 12 of ground loop 13. Loop 13 is connected to the object 14 to be picked up, which may be a glider, through leader 15. Flags 16 are securely fastened near the tips of poles 10 in any suitable manner such as by thongs 17. A short distance above the flags 16 on each pole, a releasable clip 18 is likewise secured to each pole. The releasable clips permit the loop to be pulled out therefrom as soon as contact is made.

The flags 16 are preferably of triangular configuration and are maintained taut in the plane of the poles by a second pair of releasable clips 18' of substantially the same construction as clips 18. Clips 18' are securely attached to the flags and releasably fastened to upper ply 12 at a point some distance from clips 18.

It will be obvious that when contact is made, upper ply 12 will be pulled from clips 18' as well as clips 18 thereby permitting the poles 10 to fall outwardly from their supporting sockets 11.

It will be noted that the socket 11 is partially cut away on its outward edge to permit the poles to fall over as soon as the tension of upper ply 12 has been removed.

The provision of independent and releasable flag supporting means such as clips 18' permits the tension in clip 18 to be regulated independently of the tension in clips 18'. This advantage becomes of importance when it is appreciated that the stress exerted at the tips of the poles through clips 18 becomes of considerable value when equipment is used for picking up heavy loads such as gliders weighing several tons. In addition, the stress necessary to maintain the poles 10 in an upright position is an added factor. The tension required in clips 18' may be only sufficient to maintain the flags 16 substantially taut under prevalent wind conditions.

For relatively small ground stations employing a lightweight loop where the stress on each clip is of the order of ten pounds, a conventional installation such as that disclosed in United States patent application Serial No. 411,961, filed September 23, 1941 in the name of Stuart Crosby Plummer, has been found to be satisfactory. When, however, the stress on the clips becomes appreciably greater, say on the order of 60 or 70 pounds, it has been found necessary to abandon the use of loop supporting flags entirely with a consequent loss of visibility and difficulty in conconducting satisfactory pick-up operations. It is of extreme importance, particularly in military operations involving the retrieving of aircraft from locations other than at predetermined station points and possibly from enemy territory, that the pilot be able to spot the ground station quickly and accurately. My invention has permitted the use of station flags on all types and sizes of equipment.

It will be apparent that my invention also permits the use of any desired or available shaped flags or releasable attachment between the flags and the loop. For example, the clips 18' could be replaced by any readily frangible material such as string or thread, since this connection is entirely independent of any loop or pole supporting function.

It will be obvious that my invention, if desired, can be used on either or both of the station poles and although the improvements have been discussed with respect to certain particular forms of the invention, it is not desired to be limited to such details, since many changes and modifications may well be made without departing from the spirit or scope of the invention in its broadest aspect.

Having thus described my invention, I claim:

1. In ground station equipment for an air pick-up system, a pair of station poles, a releasing connection attached directly to each of said poles, a loop releasably attached to said connections, and a flag attached to at least one of said poles at a plurality of points, said flag being releasably attached to said loop at a distance from said pole.

2. In a ground station for air pick-up systems, a line attached to an object to be picked up, a pair of station poles, a first clip attached directly to each of said poles, a portion of said line releasably attached to said first clips and supporting said station poles, a pair of station locating flags, and a second pair of releasable clips connecting said loop and said flag, the tension in said second clips being only sufficient to maintain the flag in a substantially taut position and the tension in said first clips being sufficient to support the line and poles.

HYDE W. BALLARD.